United States Patent
Saito

(10) Patent No.: US 11,513,309 B2
(45) Date of Patent: Nov. 29, 2022

(54) LENS APPARATUS, IMAGING APPARATUS, AND ACCESSORY

(71) Applicant: CANON KABUSHIKI KAISHA, Tokyo (JP)

(72) Inventor: Naoki Saito, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 327 days.

(21) Appl. No.: 16/865,627

(22) Filed: May 4, 2020

(65) Prior Publication Data
US 2020/0363605 A1 Nov. 19, 2020

(30) Foreign Application Priority Data

May 14, 2019 (JP) .............................. JP2019-091055

(51) Int. Cl.
  *G02B 7/04* (2021.01)
  *G02B 7/02* (2021.01)
  *H04N 5/232* (2006.01)
  *G03B 3/10* (2021.01)
  *G03B 17/14* (2021.01)

(52) U.S. Cl.
  CPC .............. *G02B 7/04* (2013.01); *G02B 7/022* (2013.01); *G03B 3/10* (2013.01); *H04N 5/23212* (2013.01); *G03B 17/14* (2013.01)

(58) Field of Classification Search
  CPC ......... H04N 5/232123; H04N 5/23241; H04N 5/23296; H04N 5/2254; H04N 5/22525; H04N 5/2253; H04N 5/23212; G02B 7/04; G02B 7/14; G02B 7/102; G02B 7/022; G03B 3/10; G03B 17/14; G03B 17/565; G03B 2206/00; G03B 7/04; G03B 7/14; G03B 7/102; G03B 7/022; G03B 13/36
  See application file for complete search history.

(56) References Cited

U.S. PATENT DOCUMENTS

| 8,473,761 | B2 | 6/2013 | Rathi et al. |
| 2007/0204174 | A1 | 8/2007 | Dorogusker |
| 2011/0292278 | A1 | 12/2011 | Kurihara |
| 2019/0302575 | A1* | 10/2019 | Imamura ................ H04N 5/225 |

FOREIGN PATENT DOCUMENTS

| CN | 102075172 A | 5/2011 |
| CN | 102187544 A | 9/2011 |
| CN | 102263902 A | 11/2011 |
| CN | 203217218 U | 9/2013 |
| JP | H1164957 A | 3/1999 |
| JP | 2005010703 A | 1/2005 |

OTHER PUBLICATIONS

Office Action issued in Chinese Appln. No. 202010402395.3 dated Jan. 19, 2022. English translation provided.

* cited by examiner

*Primary Examiner* — Nelson D. Hernández Hernández
(74) *Attorney, Agent, or Firm* — Rossi, Kimms & McDowell LLP

(57) ABSTRACT

A lens apparatus attachable to an imaging apparatus via an accessory, the lens apparatus includes an acquirer configured to acquire first power information indicating power available for the accessory, a determiner configured to determine second power information indicating power available for the lens apparatus based on the first power information, and a transmitter configured to transmit, to the imaging apparatus, the second power information or power information relating to the first power information and the second power information.

15 Claims, 11 Drawing Sheets

| POWER MODE No. | ALLOWABLE POWER CONSUMPTION EXAMPLE | LENS FUNCTION EXAMPLE | ADAPTER FUNCTION EXAMPLE |
|---|---|---|---|
| POWER MODE NO.1 | 0.5W | FUNCTIONAL RESTRICTION POWER STATE | FUNCTIONAL RESTRICTION POWER STATE |
| POWER MODE NO.2 | 1.0W | LOW POWER STATE | USUAL OPERATION STATE |
| POWER MODE NO.3 | 2.0W | USUAL OPERATION STATE | — |
| POWER MODE NO.4 | 3.0W | HIGH PERFORMANCE OPERATION POWER STATE | — |

FIG. 2

LENS APPARATUS, IMAGING APPARATUS, AND ACCESSORY

BACKGROUND OF THE INVENTION

Field of the Invention

The present invention relates to a lens apparatus detachably attachable to an imaging apparatus via an accessory.

Description of the Related Art

Generally, a battery of an imaging apparatus supplies power to a lens apparatus (interchangeable lens) detachably attachable to the imaging apparatus such as a digital single-lens camera and a camcorder, and causes the lens apparatus to operate. When an accessory is attachable to the imaging apparatus so as to enhance an imaging function, the imaging apparatus supplies power to an accessory, such as an extender configured to change a magnification of a focal length, and an adapter having a function of changing an ISO speed or an F-number (aperture value).

The imaging apparatus having such a battery has a limitation in power which the imaging apparatus can supply to the interchangeable lens and the accessory. Thus, it is necessary that the interchangeable lens and the accessory operate within the limited extent of the power supplied by the imaging apparatus. For example, the voltage may sharply drop and make a proper imaging operation not being performed if the interchangeable lens consumes the excessive current when remaining power of the battery is low.

Japanese Patent Laid-Open No. ("JP") H11-64957 discloses a method for determining power and voltage of an accessory attachable to the imaging apparatus by transmitting a command instructing a value corresponding to power available for the accessory from an imaging apparatus to the accessory. JP 2005-10703 discloses a method for restricting current by using a power supplying unit configured to output supplied power to an interchangeable lens in accordance with lens control information.

It is necessary to properly set power which the imaging apparatus can supply, and the power consumption of each of the interchangeable lens and the accessory, in order to properly operate a camera system configured by attaching the interchangeable lens to the imaging apparatus via the accessory. However, JP H11-64957 or JP 2005-10703 does not disclose a method for properly setting the power which the imaging apparatus can supply, and the power consumption of each of the interchangeable lens and the accessory.

SUMMARY OF THE INVENTION

The present invention provides a lens apparatus, an imaging apparatus, and an accessory, each of which can properly set power of the imaging apparatus and a power consumption of each of the lens apparatus and the accessory.

A lens apparatus according to one aspect of the present invention attachable to an imaging apparatus via an accessory, the lens apparatus includes an acquirer configured to acquire first power information indicating power available for the accessory, a determiner configured to determine second power information indicating power available for the lens apparatus based on the first power information, and a transmitter configured to transmit, to the imaging apparatus, the second power information or power information relating to the first power information and the second power information.

An imaging apparatus according to one aspect of the present invention attachable to a lens apparatus via an accessory, the imaging apparatus includes an acquirer configured to acquire first power information indicating power available for the accessory, a determiner configured to determine second power information indicating power available for the lens apparatus based on the first power information, and a transmitter configured to transmit the second power information to the lens apparatus.

An accessory according to one aspect of the present invention attachable between an imaging apparatus and a lens apparatus, the accessory comprising, a communicator configured to transmit power information indicating power available for the accessory to the imaging apparatus or the lens apparatus.

Further features of the present invention will become apparent from the following description of exemplary embodiments with reference to the attached drawings.

BRIEF DESCRIPTION OF THE DRAWINGS

FIG. 2 is a table of illustrative power modes of the imaging system according to each embodiment.

DESCRIPTION OF THE EMBODIMENTS

Referring now to the accompanying drawings, a detailed description will be given of embodiments according to the present invention.

First Embodiment

Figure 1:
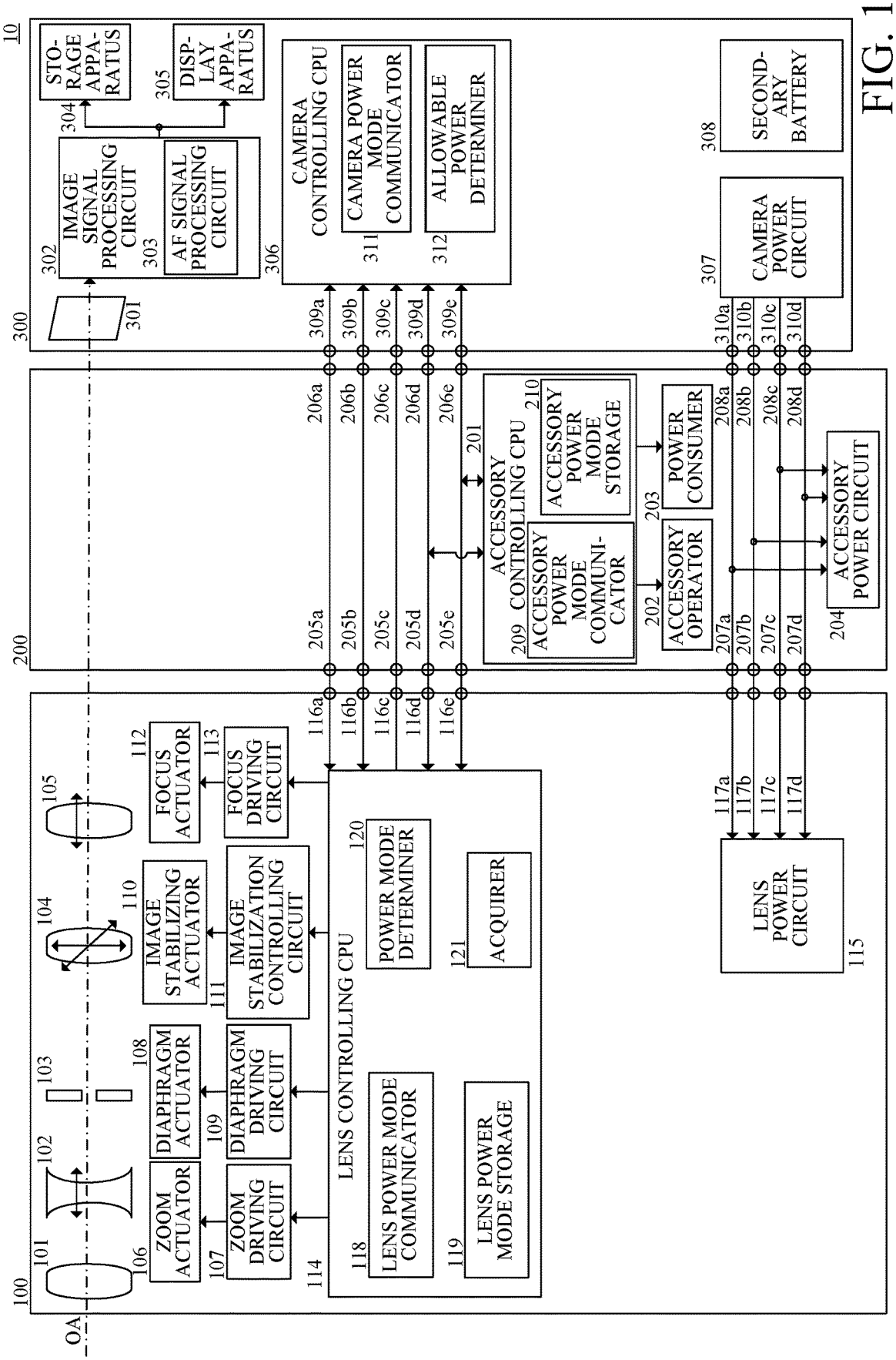
FIG. 1 is a block diagram of an imaging system according to each embodiment.

A description will now be given of a configuration of an imaging system (camera system) according to the first embodiment of the present invention with reference to FIG. 1. FIG. 1 is a block diagram of an imaging system 10. The imaging system 10 includes an interchangeable lens (lens apparatus) 100, an imaging apparatus (camera body) 300 to which the interchangeable lens 100 is detachably attached, and an accessory 200 connectable between the interchangeable lens 100 and the imaging apparatus 300. In this embodiment, the accessory 200 is an intermediate accessory connected between the interchangeable lens 100 and the imaging apparatus 300, but is not limited to this embodiment. The present embodiment can be applied to other accessories such as an accessory having a liquid crystal display function connected to the interchangeable lens 100, as long as the accessory operates by receiving the power supply from the imaging apparatus 300.

The interchangeable lens 100 includes, as an imaging optical system, a fixed front lens 101, a magnification varying lens 102, a diaphragm (aperture stop) 103, an image stabilizing lens 104, and a focus lens 105, in order from an object side to the imaging apparatus 300. Although FIG. 1 illustrates that a single lens element constitutes each of the fixed front lens 101, the magnifying varying lens 102, the image stabilizing lens 104, and the focus lens 105, one or more lens elements may constitute each of those.

The magnification varying lens 102 is moved in a direction along an optical axis OA (optical axis direction) by a zoom actuator 106 composed of a stepping motor, a DC motor, or the like, and perform is a magnification variation (zooming). A zoom driving circuit 107 supplies driving voltage and current to the zoom actuator 106. The diaphragm 103 is driven by a diaphragm actuator 108 composed of a stepping motor, a DC motor, or the like, and changes an aperture diameter. A diaphragm driving circuit 109 supplies driving voltage and current to a diaphragm actuator 108. The image stabilizing lens 104 is moved in a shift direction by an image stabilizing actuator 110 composed of a stepping motor, a voice coil motor, or the like, and performs the image stabilization. The image stabilization controlling circuit 111 supplies driving voltage and current to the image stabilizing actuator 110. The focus lens 105 is moved in the optical axis direction by a focus actuator 112 composed of a stepping motor, a voice coil motor, or the like, and performs focusing. A focus driving circuit 113 supplies driving voltage and current to the focus actuator 112.

As illustrated in FIG. 1, the interchangeable lens 100 is attached to the imaging apparatus 300 via the accessory 200. At this time, electrical contacts 116a, 116b, and 116c provided on the interchangeable lens 100 are electrically connected to electrical contacts 205a, 205b, and 205c provided on the accessory 200, respectively. Electrical contacts 206a, 206b, and 206c provided on the accessory 200 are electrically connected to electrical contacts 309a, 309b, and 309c provided on the imaging apparatus 300, respectively. Thus, various types of information can be communicated between the interchangeable lens 100 and the imaging apparatus 300. FIG. 1 illustrates the three-wire serial communication, but the present invention is not limited to this embodiment. In this embodiment, a lens controlling CPU 114 and a camera controlling CPU 306 perform serial communications while using the camera controlling CPU 306 as a clock master.

When the interchangeable lens 100 is attached to the imaging apparatus 300 via the accessory 200, electrical contacts 116d and 116e provided on the interchangeable lens 100 are electrically connected to electrical contacts 205d and 205e provided on the accessory 200, respectively. Electrical contacts 206d and 206e provided on the accessory 200 are electrically connected to electrical contacts 309d and 309e provided on the imaging apparatus 300, respectively. Thereby, various types of information can be communicated between the interchangeable lens 100 and the accessory 200, between the imaging apparatus 300 and the accessory 200, and between the interchangeable lens 100 and the imaging apparatus 300. FIG. 1 illustrates the two-wire serial communication, but the present invention is not limited to this embodiment. In this embodiment, the lens controlling CPU 114, an accessory controlling CPU (accessory controller) 201, and the camera controlling CPU 306 perform serial communications while using the camera controlling CPU 306 as a clock master.

Each of the interchangeable lens 100 and the accessory 200 stores, as specific information, optical information (focal length, F-number (aperture value), focus sensitivity, focus correcting amount, and the like) and characteristic information, and can transmit the information to the imaging apparatus 300. When the accessory 200 is attached to the interchangeable lens 100, the characteristic information of the accessory 200 is transmitted to the imaging apparatus 300. The "optical information" indicates optical specific information (focus lens sensitivity, focus correcting amount information, and the like) that changes in accordance with states of zoom, focus, aperture value, and the like. The "characteristic information" basically indicates specific information that does not change in accordance with the above described states. The characteristic information includes, for example, identification information (lens ID or accessory ID) for specifying a model and a serial number of an interchangeable lens or an accessory, a maximum communication speed, an open F-number, whether or not the lens is a zoom lens, whether or not autofocus (AF) is available, an image height, a power mode, and the like. Similarly, the interchangeable lens 100 receives specific information of the imaging apparatus 300 and the accessory 200 (for example, accessory ID, accessory power information, and the like).

Power contacts 117a, 117b, 117c, and 117d provided on the interchangeable lens 100 are electrically connected to power contacts 207a, 207b, 207c, and 207d provided on the accessory 200, respectively. Power contacts 208a, 208b, 208c, and 208d provided on the accessory 200 are electrically connected to power contacts 310a, 310b, 310c, 310d provided on the imaging apparatus 300, respectively. Thereby, the power is supplied to various sensors mounted on the interchangeable lens 100 and the accessory 200, the lens controlling CPU 114, the accessory controlling CPU 201, an accessory operator 202, a power consumer 203, and various driving circuits of the interchangeable lens 100. The accessory operator 202 is a processing circuit unit of an operation ring that allows a user to uniquely operate a variable function of the ISO speed and the aperture value. The power consumer 203 includes an organic EL information display unit that consumes relatively high power.

The power contacts 117a, 207a, 208a, and 310a are power terminals for various sensors, the lens controlling CPU 114, the accessory controlling CPU 201, and the accessory operator 202, and the power contacts 117b, 207b, 208b, and 310b are ground terminals for a power source. A camera power circuit 307, such as a DCDC converter, converts power from a secondary battery 308, such as a lithium ion battery, mounted on the imaging apparatus 300 into power of desired voltage and the power is supplied to each of the interchangeable lens 100 and the accessory 200. A lens power circuit 115 is a power conversing circuit, such as a DC-DC converter, mounted on the interchangeable lens 100, converts voltage of the power into voltage suitable for various sensors and driving circuits, and assigns the power. An accessory power circuit 204 is a circuit (accessory circuit) similar to the lens power circuit 115.

The imaging apparatus 300 includes an image sensor 301 composed of a CMOS sensor, as a photoelectric conversing element. The image sensor 301 photoelectrically converts, at its imaging plane, an optical image (object image) formed by the imaging optical system. Charges accumulated in the image sensor 301 by the photoelectric conversion are output as an imaging signal (analog signal) at a predetermined timing, and input to an image signal processing circuit 302.

The image signal processing circuit 302 converts, into a digital imaging signal, the analog imaging signal from the image sensor 301, performs various signal processing such as amplification and gamma correction for the digital imaging signal, and generates an image signal. The image signal is output to the camera controlling CPU 306, a display apparatus 305 composed of a liquid crystal display panel or the like, and a storage apparatus 304 composed of an optical disk, a semiconductor memory, or the like.

The image signal processing circuit 302 includes an AF signal processing circuit 303 as a focus information generator. The AF signal processing circuit 303 extracts, from the imaging signal output from the image sensor 301 (or the image signal generated using the imaging signal), a high-frequency component and a luminance component which are obtained from a pixel group in an AF area, that is a focus detection area, and generates a focus evaluating value signal as focus information. The focus evaluating value signal indicates a contrast state of the captured image (imaging contrast), that is sharpness, and changes as the focus lens 105 moves. An in-focus position in the AF area is a focused position where a value of the focus evaluating value signal, that is the focus evaluating value, is maximum (peaked).

The camera controlling CPU 306 includes a camera power mode communicator (transmitter) 311 and an allowable power determiner 312. The camera power mode communicator 311 communicates various information with the lens controlling CPU 114 via the electrical contacts 116a to 116c and the electrical contacts 205a to 205c, and the electrical contacts 206a to 206c and the electrical contacts 309a to 309c.

The interchangeable lens 100 incorporates the lens controlling CPU 114.

The lens controlling CPU 114 includes a lens power mode communicator (transmitter) 118, a lens power mode memory 119, a power mode determiner 120, and an acquirer 121. The lens power mode communicator 118 communicates various information with the camera controlling CPU 306 via the electrical contacts 116a to 116c and the electrical contacts 205a to 205c, and the electrical contacts 206a to 206c and the electrical contacts 309a to 309c. The lens power mode memory 119 stores a power mode supported by the interchangeable lens 100. The power mode determiner 120 determines power to be consumed by various driving circuit units. The details will be described later using a flowchart.

The accessory 200 incorporates the accessory controlling CPU 201. The accessory controlling CPU 201 includes an accessory power mode communicator (a communicator including a transmitter and a receiver) 209 and an accessory power mode memory 210. The accessory power mode communicator 209 communicates various information with the camera controlling CPU 306 and the lens controlling CPU 114 via the electrical contacts 116d, 116e, 205d, 205e, 206d, 206e, 309d, and 309e. The accessory power mode memory 210 stores a power mode supported by the accessory 200. However, when the accessory does not have plurality of power modes (has only one power mode), the accessory power mode communicator 209 and the accessory power mode memory 210 are not necessarily included in the configuration of the accessory 200.

Next, a description will be given of the power modes of the imaging system 10 (interchangeable lens 100, accessory 200, and imaging apparatus 300) in this embodiment with reference to FIG. 2. FIG. 2 gives an example of the power modes of the imaging system 10, and represents each relationship among "power mode No.", "allowable power consumption example", "lens function example", and "adapter function example" of each power mode. This embodiment describes various driving circuits of the interchangeable lens 100 having large power consumption, and power supplied to the power consumer 203 of the accessory 200.

In the power mode 1, both the interchangeable lens 100 and the accessory 200 are in a functional restriction power state. In the power mode 1, the power consumption is reduced by restricting various functions, for example, stopping the image stabilizing function, reducing the focus driving speed, and reducing the luminance of the organic EL information display. The power mode 2 allows the accessory 200 to operate usual image capturing without stopping or restricting the function of the accessory. The power mode 2 does not stop the function of the interchangeable lens 100, but reduces the power consumption by restricting the speed and the movable range of each actuator. Since it is a known technique to reduce the power consumption of an actuator, a detailed description thereof will be omitted. In this embodiment, the accessory 200 has the above-described two power modes, and only the interchangeable lens 100 is included in the power mode 3 and after. However, the present invention is not limited to this embodiment.

The power mode 3 allows the interchangeable lens 100 to operate usual image capturing without stopping or restricting the function. The power mode 4 not only performs usual image capturing, but increases the power to supply to the actuator (for example, increases the applied voltage). The power mode 4 is to improve the function by expanding a target area for the image stabilization, stabilizing larger camera shakes, and increasing the focus driving speed during autofocus. Although above example has been described of the assumed operations of the interchangeable lens 100 and the accessory 200 in each power mode, the operations in each power mode is not limited to this embodiment.

The lens power mode memory 119 stores one or more of these power modes supported by the interchangeable lens 100. The accessory power mode memory 210 stores one or more of these power modes supported by the accessory 200. However, when an accessory has no plurality of power modes (has only one power mode), it is not necessary to include the accessory power mode communicator 209 and the accessory power mode memory 210. Since the information to be stored only needs to associate the power mode with the allowable power consumption, the information to be stored may be information on the power mode only or the value itself of the allowable power consumption. The allowable power determiner 312 determines, from these power modes, a state of power to be supplied to the interchangeable lens 100 and the accessory 200, and supplies the power.

Figure 3A:
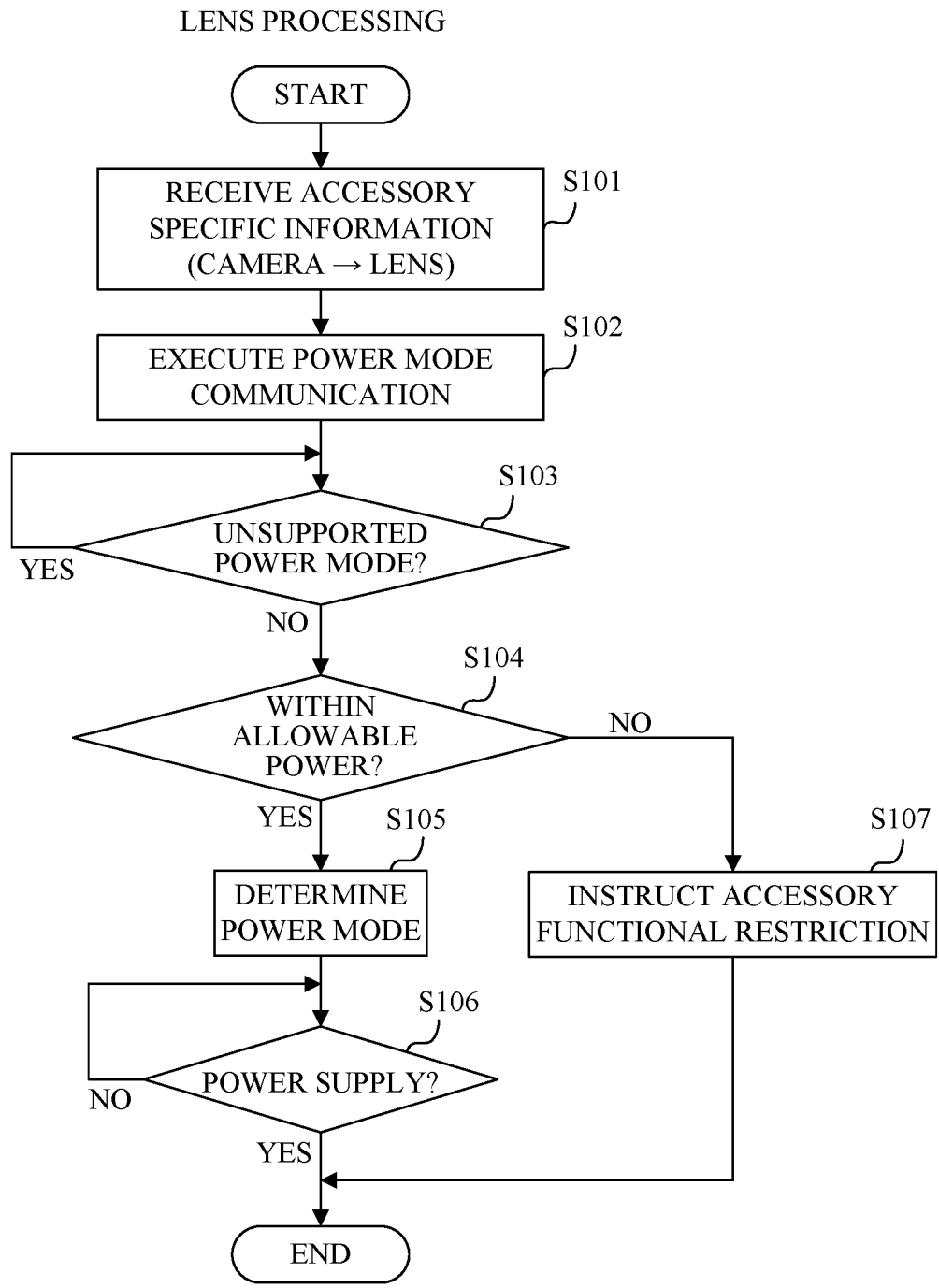
FIGS. 3A to 3C are flowcharts describing operations of the imaging system according to the first embodiment.
Figure 3B:
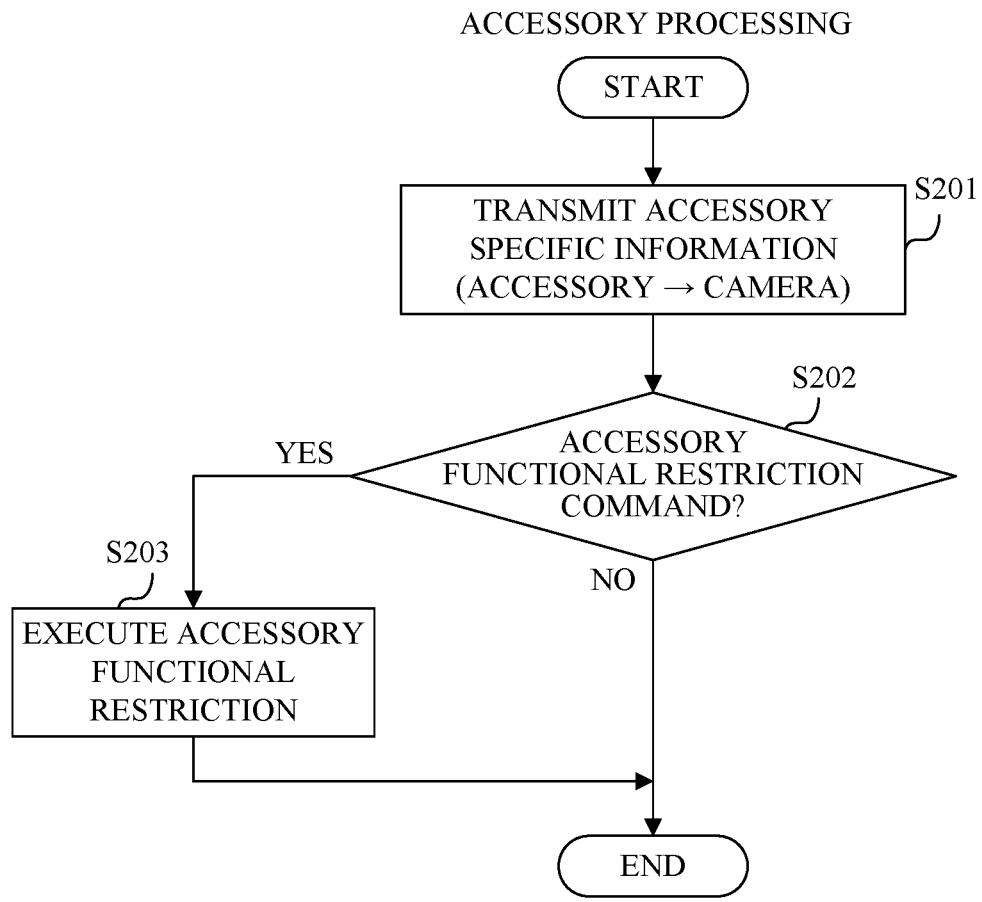
Figure 3C:
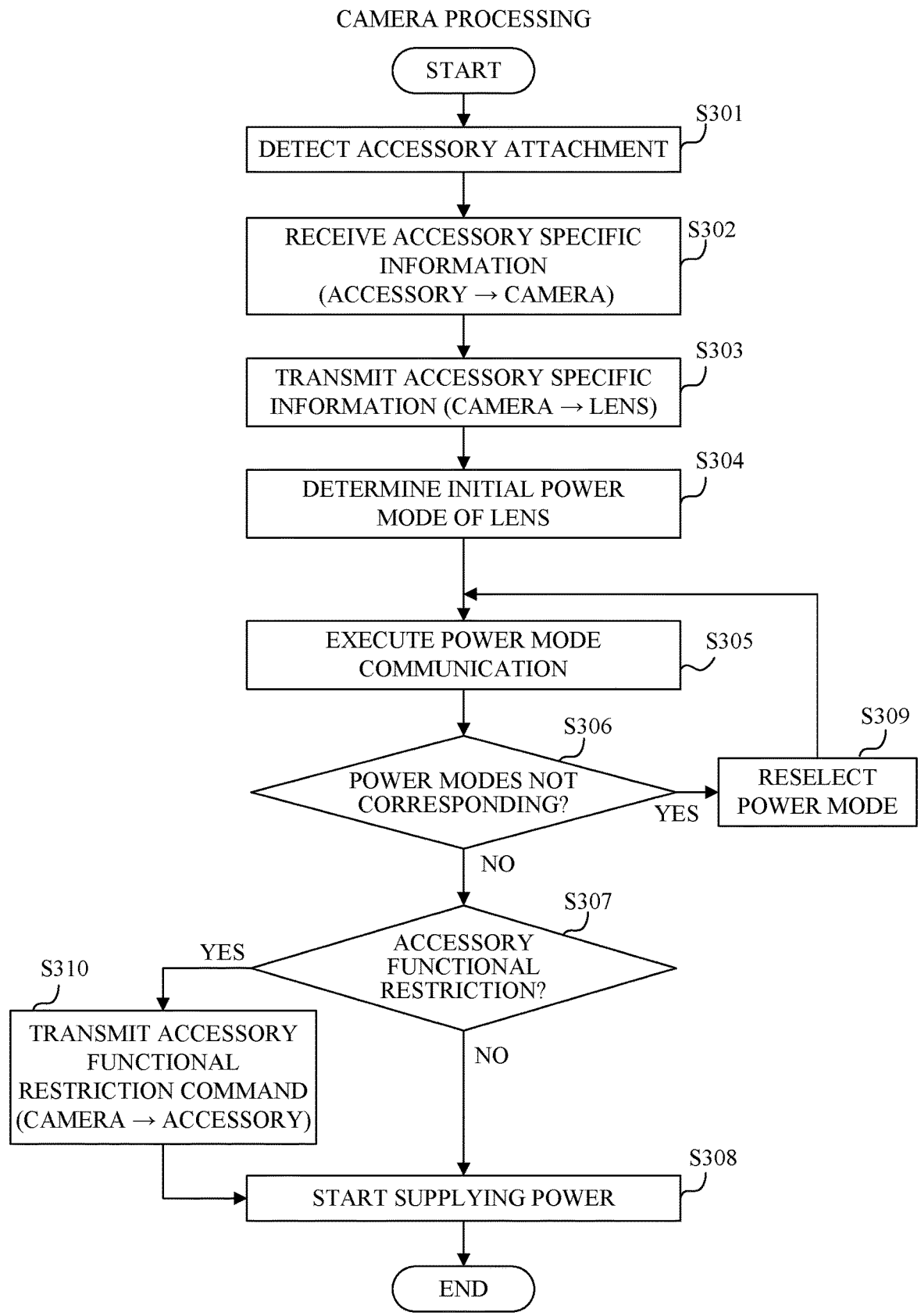

Next, a description will be given of operation of the interchangeable lens 100, the accessory 200, and the imaging apparatus 300 included in the imaging system 10 in this embodiment with reference to FIGS. 3A to 3C. FIG. 3A is a flowchart describing the operation of the interchangeable lens 100 (lens processing). FIG. 3B is a flowchart describing the operation of the accessory 200 (accessory processing). FIG. 3C is a flowchart describing the operation of the imaging apparatus 300 (camera processing). Each step in FIGS. 3A to 3C is mainly executed by the lens controlling CPU 114, the accessory controlling CPU 201, and the camera controlling CPU 306, respectively. This embodiment will describe a case where the accessory 200 does not have a plurality of power mode (namely, the case where the accessory 200 has only one power mode).

First, referring to FIG. 3A, a description will be given of the operation of the lens controlling CPU 114 (lens processing). In the step S101, the lens controlling CPU 114 (acquirer 121) receives, from the camera controlling CPU 306, accessory specific information that has been received by the camera controlling CPU 306 from the accessory controlling CPU 201. The accessory specific information includes information relating to the power of the accessory 200, such as identification information of the accessory 200 or accessory power information (power mode information).

Subsequently in the step S102, the lens controlling CPU 114 executes power mode communications with the camera controlling CPU 306. That is, the lens controlling CPU 114 uses the camera power mode communicator 311 to receive the power mode instructed (allowed) by the imaging apparatus 300. In a clock-synchronous communication system, if the communication system is a full-duplex system, the interchangeable lens 100 and the imaging apparatus 300 can transmit and receive the respective power mode communication.

Subsequently in the step S103, the lens controlling CPU 114 determines whether the power mode instructed by the imaging apparatus 300 and received in the step S102 corresponds to a power mode stored in the lens power mode memory 119 and supported by the interchangeable lens 100. If the power mode instructed by the imaging apparatus 300 is not supported by the interchangeable lens 100 (unsupported power mode), the lens controlling CPU 114 repeats the step S103 so as to perform the communication for the lens power mode again. On the other hand, if the power mode instructed by the imaging apparatus 300 is supported by the interchangeable lens 100, the process proceeds to the step S104.

In the step S104, the power mode determiner 120 of the lens controlling CPU 114 determines whether the allowable power of the imaging apparatus 300 is not exceeded by the sum (a total value) of the power consumption of the power mode available (settable) for the interchangeable lens 100 and the power consumption of the accessory 200. The power mode determiner 120 makes this determination based on the power information of the accessory 200 received in the step S101, and the power mode information instructed (allowed) by the imaging apparatus 300 and received in the step S102. If the total value is within the allowable power, the process proceeds to the step S105. On the other hand, when the total value exceeds the allowable power, the process proceeds to the step S107.

In the step S105, the power mode determiner (determiner) 120 determines the power mode of the interchangeable lens 100. As described above, the power mode determiner 120 determines the power mode of the interchangeable lens 100 based on information relating to the power of the accessory 200 (ID information or power mode information of the accessory 200). Thereafter, the lens power mode communicator 118 transmits a plurality of or one of the power modes supported by the interchangeable lens 100 to the imaging apparatus 300. The power mode information to be transmitted is stored on the lens power mode memory 119. The power mode transmitted here is supported by the interchangeable lens 100, lets the accessory 200 operate, and is included in the power mode instructed by the imaging apparatus 300 and received in the step S102.

For example, a case will be described where the imaging apparatus 300 instructs the power mode 3 having the allowable power of 2.0 W. It is assumed that the power consumption of the accessory 200 is 0.5 W (that is obtainable from the accessory specific information), and that the power modes selectable for the interchangeable lens 100 are the power modes 1 to 3 having the allowable power of 0.5 W to 2.0 W. In order to operate the interchangeable lens 100 and the accessory 200 in the power mode 3 having the allowable power of 2.0 W allowed by the imaging apparatus 300, the interchangeable lens 100 operates in the power modes 1 or 2 having the allowable power of 0.5 W or 1.0 W. Thus, the lens power mode communicator 118 selects the power mode 1 or power mode 2. At this time, if the interchangeable lens 100 only supports the power mode 3 having the allowable power of 2.0 W, when the accessory 200 is operated, the total value exceeds the allowable power of 2.0 W of the imaging apparatus 300. In the step S107, the lens controlling CPU 114 transmits, to the camera controlling CPU 306, a signal instructing a functional restriction of the accessory 200 (notifying the imaging apparatus 300 to change the power mode of the accessory 200). The imaging apparatus 300 may include a notifying unit (camera controlling CPU 306, display apparatus 305, etc.) configured to notify the user of the functional restriction when the signal instructing the functional restriction is transmitted to the imaging apparatus 300.

Subsequently in the step S106, the lens controlling CPU 114 waits until receiving a power supply from the imaging apparatus 300 via the power contacts 117*a* to 117*d*. If the driving circuit is turned on to drive various actuators without a power supply and the power is supplied, an overcurrent may flow to the actuator and may damage the power circuit and the actuator.

Next, referring to FIG. 3B, a description will be given of the operation of the accessory controlling CPU 201 (accessory processing). In the step S201, the accessory controlling CPU 201 transmits the accessory specific information to the camera controlling CPU 306. The information to be transmitted is as described above in the step S101. In this embodiment, the camera controlling CPU 306 and the accessory controlling CPU 201 communicates with each other by the two-wire serial communication via electrical contacts 116*d*, 116*e*, 205*d*, 205*e*, 206*d*, 206*e*, 309*d*, and 309*e*.

Subsequently, in the step S202, the accessory controlling CPU 201 determines whether the camera controlling CPU 306 transmits a command for the accessory functional restriction in the step S310 described below. If the accessory functional restriction is not instructed, the accessory controlling CPU 201 waits until receiving the power supply from the imaging apparatus 300. On the other hand, if the accessory functional restriction is instructed, the process proceeds to the step S203, and the accessory controlling CPU 201 executes the accessory functional restriction described below.

Referring now to FIG. 3C, a description will be given of operation of the camera controlling CPU 306 (camera processing). In the step S301, the camera controlling CPU 306 detects that the interchangeable lens 100 and the accessory 200 are attached to the imaging apparatus 300. This detection can be performed by using the electrical contact or mounting another contact or sensor for detection.

Subsequently, in the step S302, the camera controlling CPU 306 receives the accessory specific information from the accessory controlling CPU 201. The received information is as described above in the step S101. Subsequently in the step S303, the camera controlling CPU 306 transmits the accessory specific information to the lens controlling CPU 114. The information to be transmitted is as described above in the step S101.

Subsequently, in the step S304, the allowable power determiner 312 of the camera controlling CPU 306 determines an initial power mode of the interchangeable lens 100. Subsequently in the step S305, the camera controlling CPU 306 executes the power mode communication with the lens controlling CPU 114. Namely, by communication, the camera controlling CPU 306 notifies the lens controlling CPU 114 of the power mode (initial power mode) determined in the step S304. At this time, the camera controlling CPU 306 receives the plurality of or one of supported lens power modes from the lens controlling CPU 114.

Subsequently in the step S306, the camera controlling CPU 306 determines whether the camera power mode determined by the allowable power determiner 312 corresponds to the lens power mode received from the lens controlling CPU 114 in the step S304. If the camera power mode does not correspond to the lens power mode, the imaging apparatus 300 cannot supply the power to the interchangeable lens 100, and the process proceeds to the step S309. In the step S309, the camera controlling CPU 306 selects the camera power mode supported by the interchangeable lens 100. Thereafter in the step S305, the camera controlling CPU 306 notifies the interchangeable lens 100 of the camera power mode again.

On the other hand, if the camera power mode corresponds to the lens power mode in the step S306, the process proceeds to the step S307. In the step S307, the camera controlling CPU 306 determines whether the lens controlling CPU 114 transmits the signal instructing the accessory functional restriction in the step S107. If the accessory restriction is not instructed, the process proceeds to the step S308. On the other hand, if the accessory functional restriction is instructed, the process proceeds to the step S310, and the camera controlling CPU 306 transmits the command for the accessory functional restriction to the accessory controlling CPU 201. In this embodiment, the accessory 200 does not have a plurality of power modes (namely, the accessory 200 has only one power mode). When restricting the accessory function, for example, the camera controlling CPU 306 transmits a command for an operation inhibition to the accessory controlling CPU 201 and controls the accessory 200 so that the accessory 200 does not consume power. At this time, the camera controlling CPU 306 may display a message to notify the user of the operation inhibition of the accessory 200 on the display apparatus 305 of the imaging apparatus 300.

Subsequently in the step S308, the camera controlling CPU 306 starts supplying the power since the power mode supported by the interchangeable lens 100 corresponds to the power mode instructed by the imaging apparatus 300 each other. That is, the camera controlling CPU 306 starts supplying power to each of the interchangeable lens 100 and the accessory 200 from the imaging apparatus 300 via the power terminals, and terminates this processing.

This embodiment can match the power mode supported by the interchangeable lens 100 and the power mode instructed by the imaging apparatus 300. Further, according to this embodiment, the imaging apparatus 300 can properly make the interchangeable lens 100 and the accessory 200 operate within the power which the imaging apparatus can supply, by communicating the information on the power consumption corresponding to the instruction of the power mode.

Second Embodiment

Figure 4A:
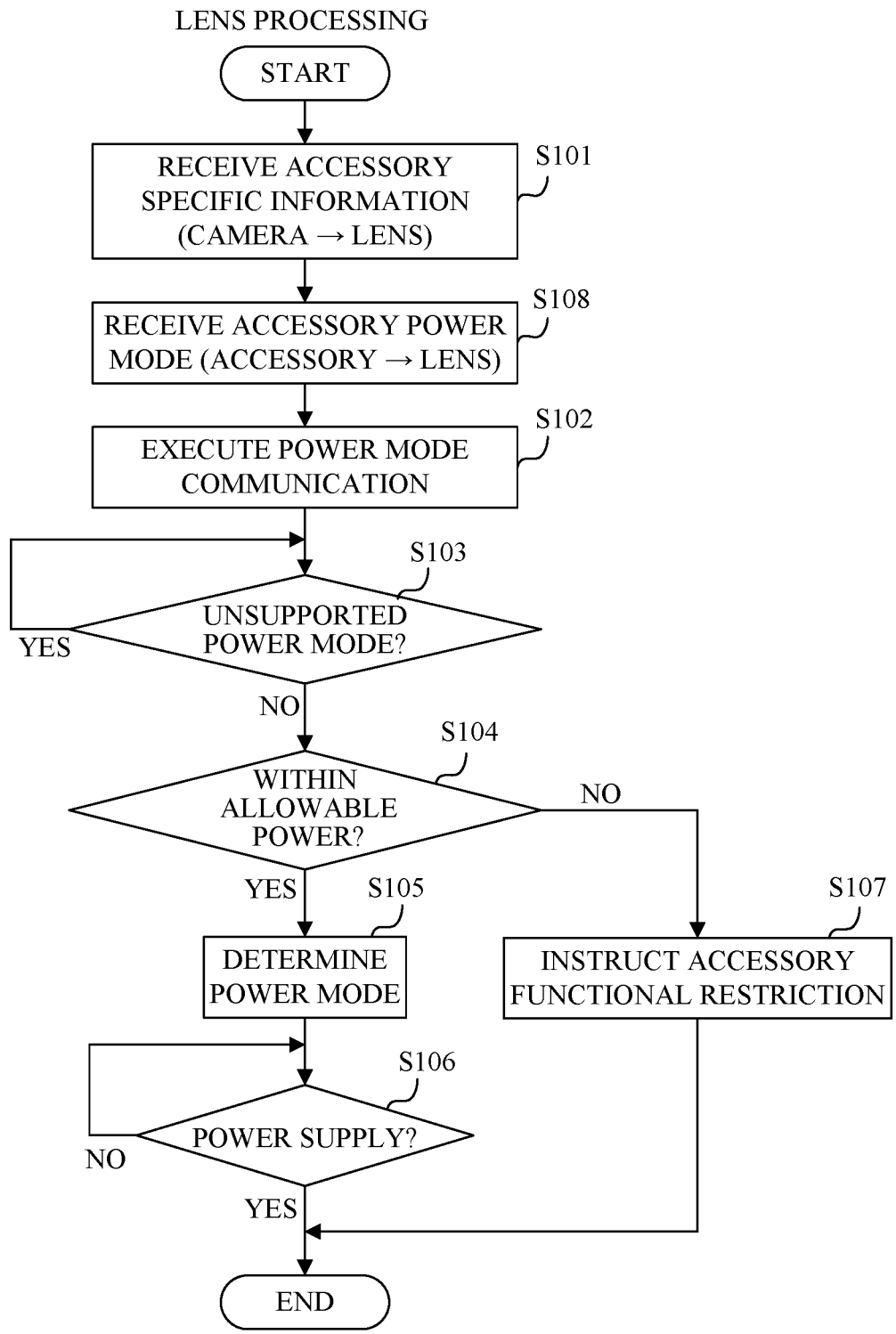
FIGS. 4A to 4C are flowcharts describing operations of the imaging system according to the second embodiment.
Figure 4B:
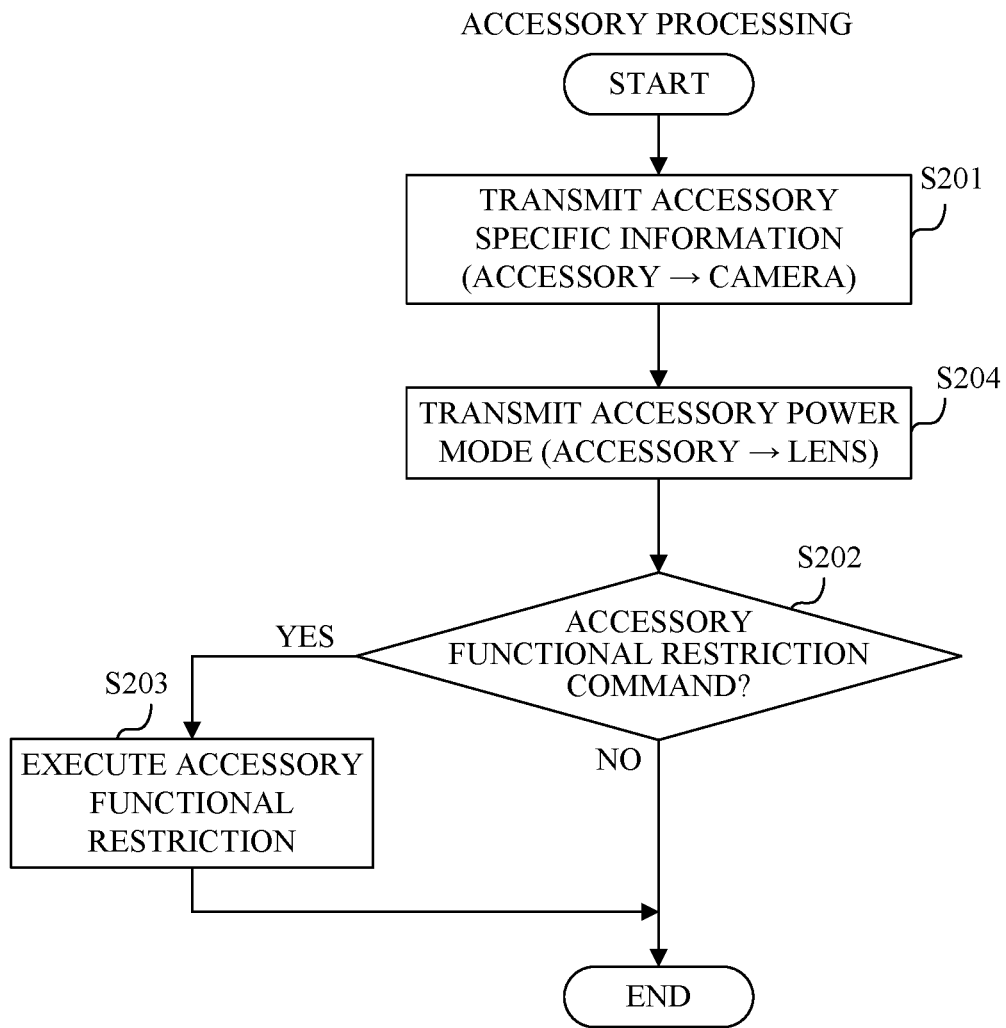
Figure 4C:
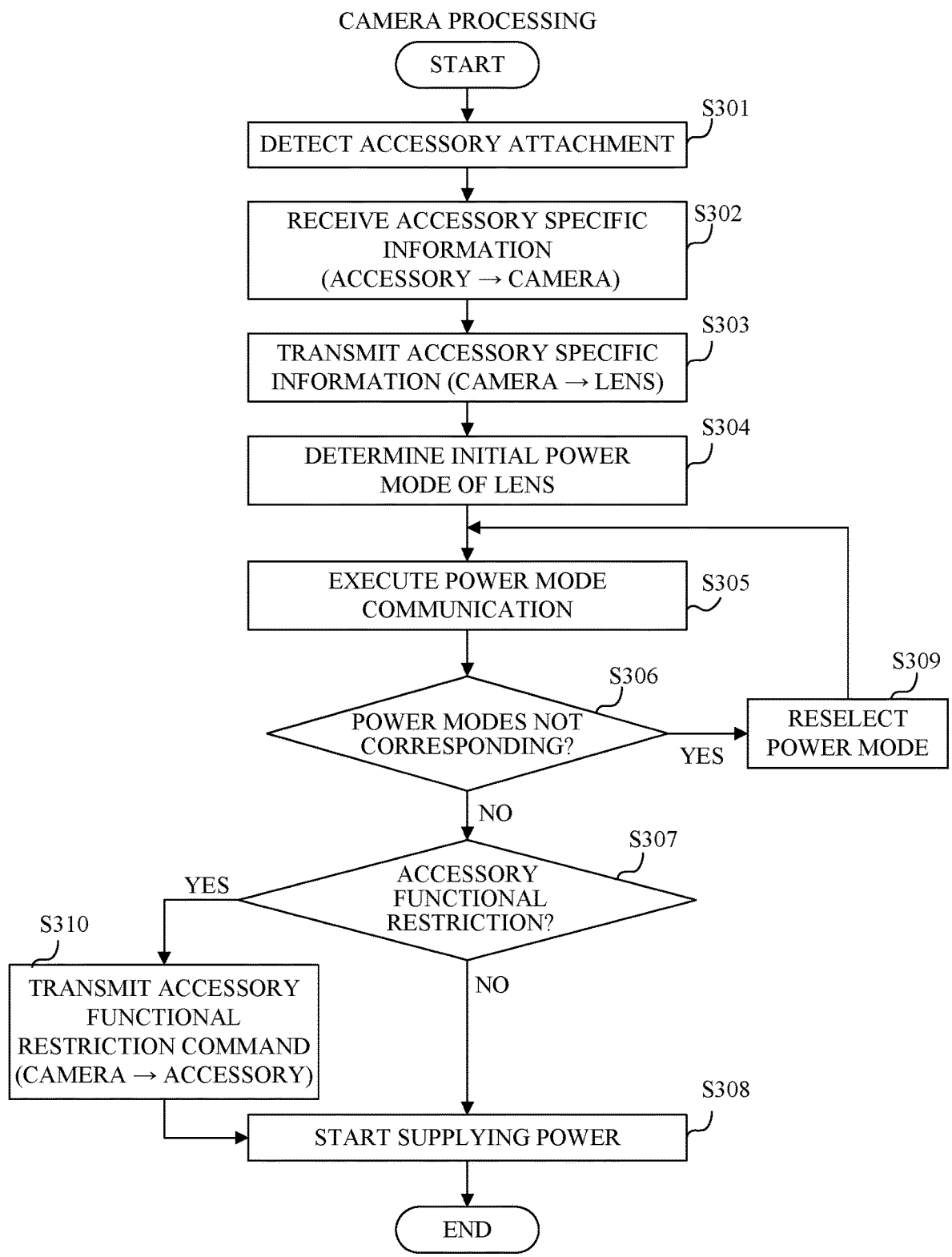

Referring now to FIGS. 4A to 4C, a description will be given of the second embodiment of the present invention. FIG. 4A is a flowchart describing the operation of the interchangeable lens 100 (lens processing). FIG. 4B is a flowchart describing the operation of the accessory 200 (accessory processing). FIG. 4C is a flowchart describing the operation (camera processing) of imaging apparatus 300. Each step in FIGS. 4A to 4C is mainly executed by the lens controlling CPU 114, the accessory controlling CPU 201, and the camera controlling CPU 306, respectively. In this embodiment, the accessory 200 has a plurality of power modes.

FIG. 4A is different from FIG. 3A in that the step S108 is inserted between the step S101 and the step S102. FIG. 4B is different from FIG. 3B in that the step S204 is inserted between the steps S201 and S202. FIG. 4C describes the same processing as that of FIG. 3C. The other steps in FIGS. 4A to 4C are the same as those in FIGS. 3A to 3C described in the first embodiment, respectively, and thus a description thereof will be omitted.

First, a description will be given of the operation of the lens controlling CPU 114 (lens processing) with reference to FIG. 4A. After receiving the accessory specific information in the step S101, the lens controlling CPU 114 receives an accessory power mode from the accessory controlling CPU 201, using the accessory power mode communicator 209 in the step S108. The accessory power mode memory 210 stores the power mode of the accessory. The lens controlling CPU 114 communicates with the accessory controlling CPU 201 by the two-wire serial communication via the electrical contacts 116d, 116e, 205d, 205e, 206d, 206e, 309d, and 309e.

In the step S103, the lens controlling CPU 114 determines whether the power mode instructed by the imaging apparatus 300 and received in the step S102 corresponds to a power mode supported by the interchangeable lens 100. That is, the lens controlling CPU 114 determines whether the instructed power mode supports power of equal to or larger than the sum (total power) of the power of the accessory 200 received in the step S108 and the power of the interchangeable lens 100 stored on the lens power mode memory 119. If the power mode instructed by the imaging apparatus 300 is not supported by the interchangeable lens 100 (unsupported power mode), the lens controlling CPU 114 repeats the step S103 so as to perform the communication for the lens power mode again. On the other hand, if the power mode instructed by the imaging apparatus 300 is supported by the interchangeable lens 100, the process proceeds to the step S104.

In the step S104, the power mode determiner 120 of the lens controlling CPU 114 determines whether the sum (total value) of the consumable power of settable power mode for the interchangeable lens 100 and the power consumption of the accessory 200 is within the allowable power of the imaging apparatus 300. The power mode determiner 120 makes this determination based on the information on the power mode of the accessory 200 received in the step S108, and the power mode instructed (allowed) by the imaging apparatus 300 and received in the step S102. If the total value is within the allowable power, the process proceeds to the step S105. On the other hand, if the total value exceeds the allowable power, the process proceeds to the step S107.

In the step S105, the power mode determiner 120 determines the power mode of each of the interchangeable lens 100 and the accessory 200. Thereafter, the lens power mode communicator 118 transmits, to the imaging apparatus 300, one or more of the power modes (total power mode) corresponding to the sum of the power (total power) of the interchangeable lens 100 and the accessory 200. The lens power mode memory 119 stores the power mode information to be transmitted.

An example will be described of a case where the imaging apparatus 300 instructs the power mode 3 having the allowable power of 2.0 W with reference to FIG. 2. It is assumed that the accessory 200 has power modes 1 to 2 consuming 0.5 W to 1.0 W, and the interchangeable lens 100 has selectable power modes 1 to 3 having the allowable power of 0.5 W to 2.0 W. In this case, the combination of the accessory power mode 2 (1.0 W) and the lens power mode 2 (1.0 W) has the maximum total value (maximum total power) of the interchangeable lens 100 and the accessory 200 among combinations of the power modes within the allowable power instructed by the imaging apparatus 300.

Thereby, the power mode selected by the lens power mode communicator 118 is a combination of the power mode 1 (0.5 W) and the power mode 2 (1.0 W). The lens controlling CPU 114 controls the interchangeable lens 100 in the power mode 1 (0.5 W) or power mode 2 (1.0 W).

At this time, for example, it is assumed that the accessory 200 has a settable power mode of 1.5 W. If the interchangeable lens 100 only has the power mode 2 of 1.0 W, when the accessory 200 operates, the total power of the interchangeable lens 100 and the accessory 200 is 2.5 W. In order to prevent the total power from exceeding the allowable power of 2.0 W allowed by the imaging apparatus 300, the lens controlling CPU 114 transmits a notification for the accessory functional restriction to the camera controlling CPU 306 in the step S107.

Next, a description will be given of the operation of the accessory controlling CPU 201 (accessory processing) with reference to FIG. 4B. In the step S204, the accessory power mode communicator 209 of the accessory controlling CPU 201 transmits the power mode of the accessory 200 (accessory power mode) to the lens controlling CPU 114. The accessory power mode memory 210 stores the accessory power mode.

Next, a description will be given of the operation of the camera controlling CPU 306 (camera processing) with reference to FIG. 4C. In this embodiment, steps other than the step S310 are the same as those in the first embodiment described in FIG. 3C. In the step S310, the camera controlling CPU 306 transmits the command for the accessory functional restriction to the accessory controlling CPU 201. In this embodiment, the accessory 200 has the plurality of power modes. For describing the accessory functional restriction, for example, it is assumed that the imaging apparatus 300 has allowable power of 2.0 W and the accessory 200 has a settable power mode of 1.5 W. If the interchangeable lens 100 only has the power mode 2 of 1.0 W, the total power of the interchangeable lens 100 and the accessory 200 is 2.5 W, exceeding the allowable power. In this case, the camera controlling CPU 306 transmits, to the accessory controlling CPU 201, a command to operate only in the power mode 1 of 0.5 W. Thus, the total power of the interchangeable lens 100 and the accessory 200 is 1.5 W, which is within the allowable power of 2.0 W allowed by the imaging apparatus 300. At this time, the camera controlling CPU 306 may display a message on the display apparatus 305 of the imaging apparatus 300 to notify the user of reduction in the capability of some functions of the accessory 200 (for example, reduction in the brightness of the organic EL information display).

By providing the accessory 200 with the plurality of power modes, this embodiment can make the interchangeable lens 100 and the accessory 200 properly operate within the power which the imaging apparatus can supply.

Third Embodiment

Figure 5A:
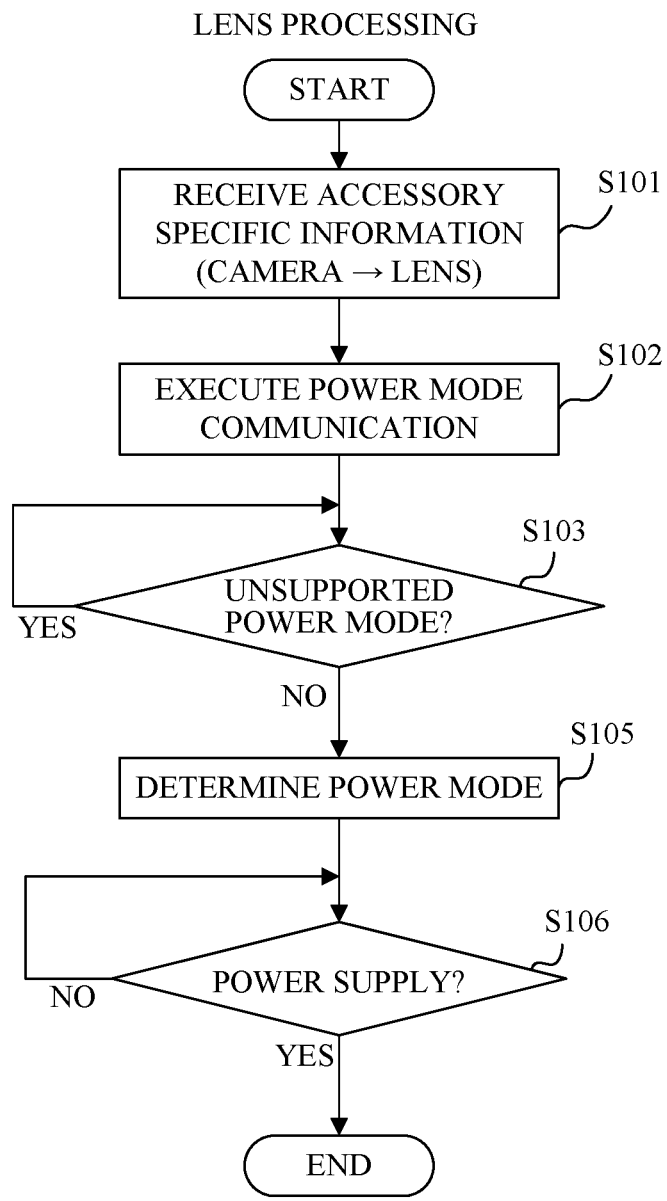
FIG. 5A to 5C are flowcharts describing operations of the imaging system according to the third embodiment.
Figure 5B:
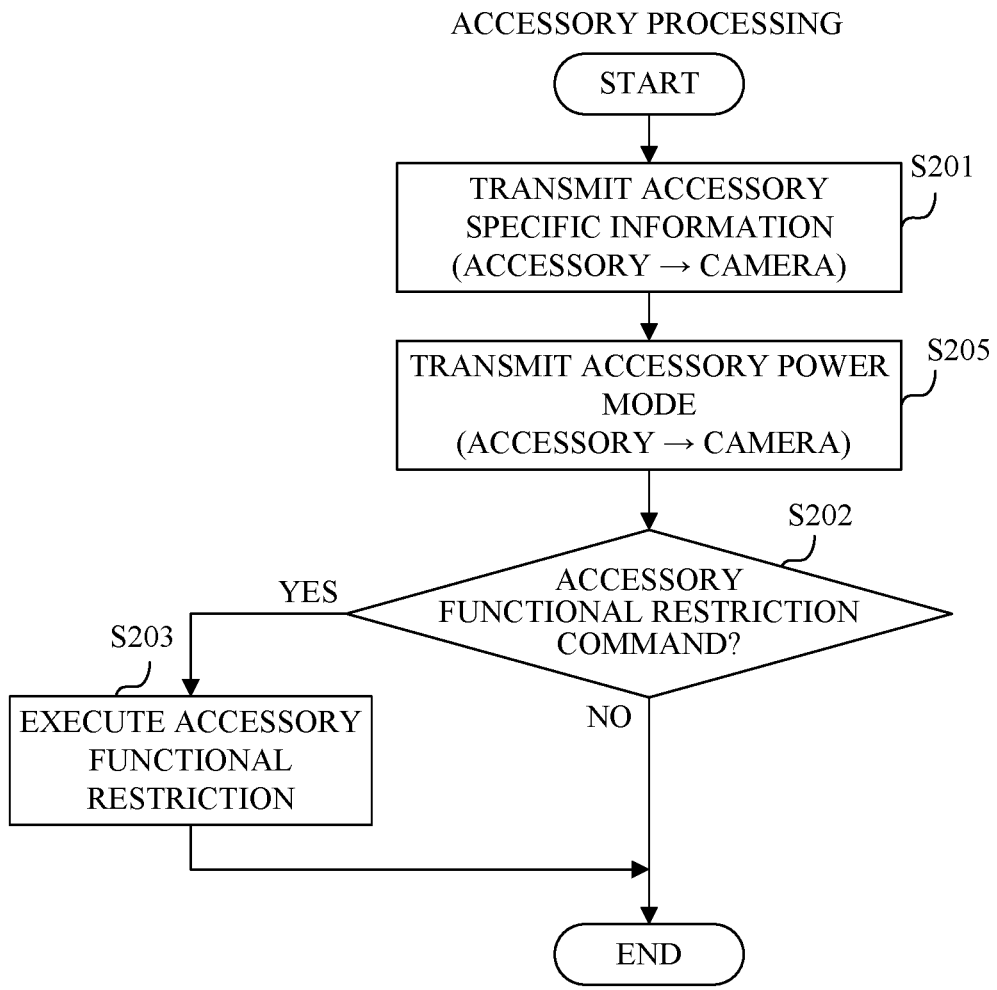
Figure 5C:
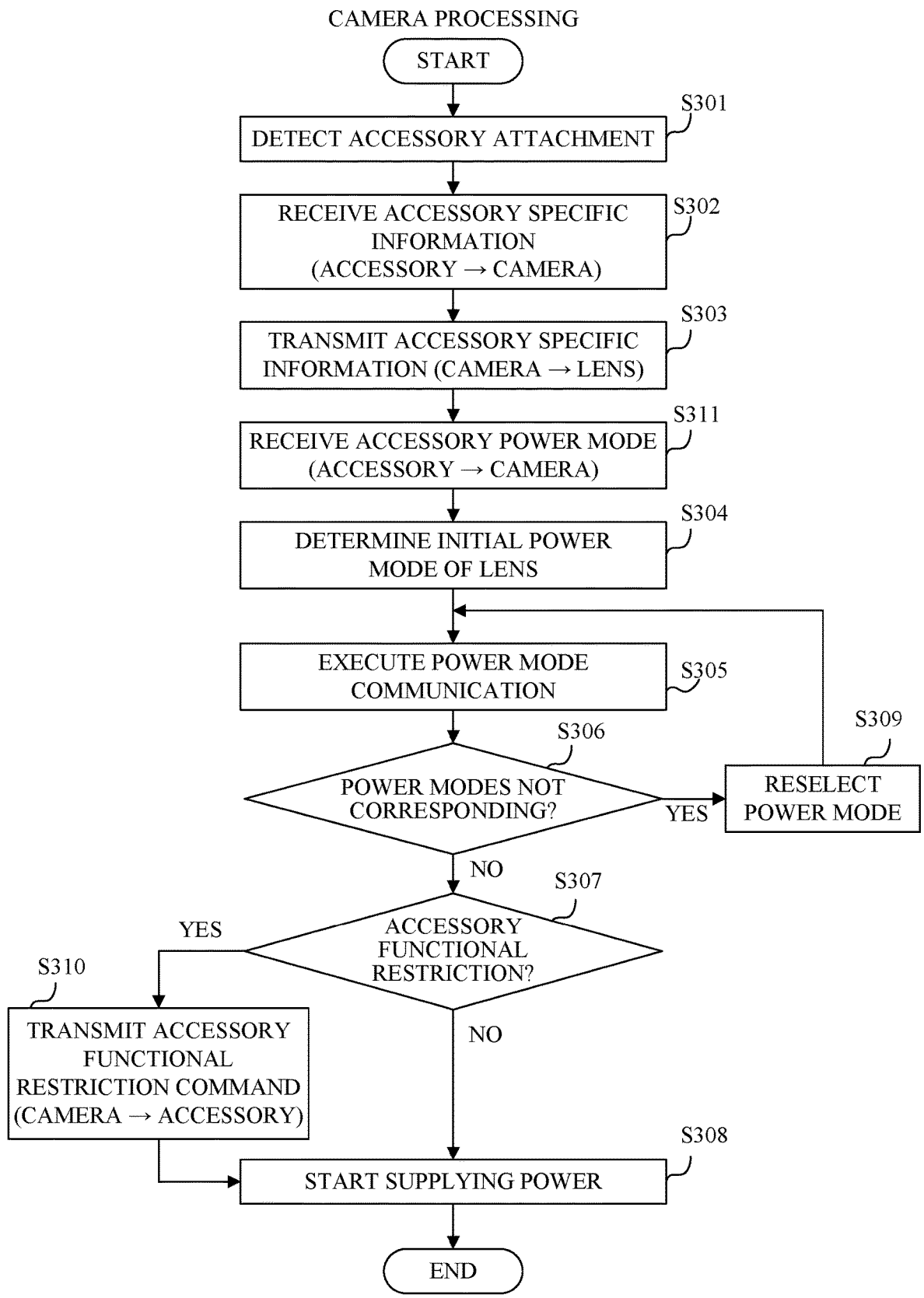

Next, the third embodiment of the present invention will be described with reference to FIGS. 5A to 5C. FIG. 5A is a flowchart describing the operation of the interchangeable lens 100 (lens processing). FIG. 5B is a flowchart describing the operation of the accessory 200 (accessory processing). FIG. 5C is a flowchart describing the operation of imaging apparatus 300 (camera processing). Each step in FIGS. 5A to 5C is mainly executed by the lens controlling CPU 114, the accessory controlling CPU 201, and the camera controlling CPU 306, respectively. In this embodiment, the accessory 200 has a plurality of power modes, and the imaging apparatus 300 notifies the interchangeable lens 100 of a power mode available for the interchangeable lens 100 in order to operate the interchangeable lens 100 and the accessory 200.

FIG. 5A is different from FIG. 3A in that the step S104 is not provided. FIG. 5B is different from FIG. 3B in that the step S205 is inserted between the step S201 and the step S202. FIG. 5C is different from FIG. 3C in that the step S311 is inserted between the step S303 and the step S304. The other steps in FIGS. 5A to 5C are the same as those in FIGS. 3A to 3C described in the first embodiment, respectively, and thus description thereof will be omitted.

First, a description will be given of the operation of the lens controlling CPU 114 (lens processing) with reference to FIG. 5A. After the lens controlling CPU 114 receives the accessory specific information in the step S101 and executes the power mode communication in the step S102, the process proceeds to the step S103. In the step S103, the lens controlling CPU 114 determines whether the power mode instructed by the imaging apparatus 300 and received in the step S102 corresponds to a power mode stored in the lens power mode memory 119 and supported by the interchangeable lens 100. The power mode determiner 120 of the lens controlling CPU 114 makes this determination based on the information on the power mode instructed (allowed) by the imaging apparatus 300 received in the step S102. If the power mode instructed by the imaging apparatus 300 (unsupported power mode), the lens controlling CPU 114 returns to the step S102 so as to perform the communication for the lens power mode again. On the other hand, if the power mode instructed by the imaging apparatus 300 is supported by the interchangeable lens 100, the process proceeds to the step S105.

In the step S105, the power mode determiner 120 determines the power mode of the interchangeable lens 100. Thereafter, the lens power mode communicator 118 transmits a plurality of or one of the power modes supported by the interchangeable lens 100 to the imaging apparatus 300. The lens power mode memory 119 stores the power mode information to be transmitted. The power mode transmitted here is a power mode supported by the interchangeable lens 100 among the power mode instructed by the imaging apparatus 300 received in the step S102.

An example will be described of a case where the imaging apparatus 300 instructs the power mode 3 having the allowable power of 2.0 W in FIG. 2. At this time, the interchangeable lens 100 operates within the allowable power of 0.5 W to 2.0 W of the power modes 1 to 3. Thus, the lens power mode communicator 118 selects power modes 1 to 3.

Next, a description will be given of the operation of the accessory controlling CPU 201 (accessory processing) with reference to FIG. 5B. In the step S205, the accessory power mode communicator 209 of the accessory controlling CPU 201 transmits the power mode of the accessory 200 (accessory power mode) to the camera controlling CPU 306. The accessory power mode memory 210 stores the accessory power mode.

Next, a description will be given of the operation of the camera controlling CPU 306 (camera processing) with reference to FIG. 5C. In the step S311, the camera controlling CPU 306 receives the accessory power mode transmitted from the accessory power mode communicator 209 in the step S205.

Subsequently, in the step S304, the allowable power determiner 312 of the camera controlling CPU 306 determines the initial power mode of the interchangeable lens 100. The allowable power determiner 312 determines, as the initial power mode of the interchangeable lens 100, a power mode corresponding to a difference between the allowable power of the imaging apparatus 300 and the power consumption of the accessory 200 based on the information on the accessory power mode received in the step S311.

An example will be described of a case where the imaging apparatus 300 has the power mode 4 having the allowable power of 3.0 W in FIG. 2. When the accessory 200 is in the power mode 1 having the allowable power of 0.5 W the allowable power determiner 312 determines the power modes 1 to 3 having the allowable power of 0.5 W to 2.0 W as the initial power mode of the interchangeable lens 100.

According to the present embodiment, the imaging apparatus 300 notifies the interchangeable lens 100 of the power mode that can be supplied, so that the interchangeable lens 100 and the accessory 200 can properly operate within power which the imaging apparatus can currently supply.

In each embodiment, a lens apparatus (interchangeable lens 100) is attachable to the imaging apparatus 300 via the accessory 200, and has an acquirer (acquirer 121), a determiner (power mode determiner 120), and a transmitter (lens power mode communicator 118). The acquirer acquires first power information (for example, accessory ID information or power mode information) indicating power available for the accessory. The determiner determines second power information (for example, power mode of the lens apparatus) indicating power available for the lens apparatus based on the first power information. The transmitter transmits, to the imaging apparatus, the second power information or power information (for example, information on the power mode) relating to the first power information and the second power information.

The acquirer may acquire identification information of the accessory apparatus from the imaging apparatus, and may acquire the first power information based on the identification information (first embodiment). The transmitter may transmit the second power information to the imaging apparatus.

The acquirer may acquire the first power information from the accessory via communication (second embodiment). The transmitter may transmit power information relating to the first and second power information to the imaging apparatus. The second power information may be one of a plurality of power information settable for the lens apparatus. Among the plurality of power information, the power information relating to the first power information and the second power information is larger than the sum of the power indicated by the first power information and the power indicated by the second power information, and is closest to the sum of the power indicated by the first power information and the power indicated by the second power information.

The determiner may acquire, from the imaging apparatus, third power information indicating power which the imaging apparatus can currently supply, and determines the second power information based on the first power information and the third power information. The determiner determines the second power information such that the sum of the power indicated by the first power information and the power indicated by the second power information is equal to or less than the power indicated by the third power information. When the sum of the power indicated by the first power information and the power indicated by the second power information exceeds the power indicated by the third power information, the transmitter may transmit a signal instructing a functional restriction of the accessory to the imaging apparatus. The imaging apparatus may include a notifying unit (camera controlling CPU 306, display apparatus 305, etc.) configured to notify the user of the functional restriction when the signal is transmitted to the imaging apparatus.

The imaging apparatus is attachable to the lens apparatus via the accessory, and includes an acquirer (camera controlling CPU 306), a determiner (allowable power determiner 312), and a communicator (camera power mode communicator 311). The acquirer acquires the first power information indicating the power available for the accessory. The determiner determines, based on the first power information, the second power information indicating power available for the lens apparatus. The communicator transmits the second power information to the lens apparatus (third embodiment). The determiner may determine the second power information based on the first power information and the third power information indicating the power which the imaging apparatus can currently supply. The determiner may determine the second power information such that the sum of the power indicated by the first power information and the power indicated by the second power information is equal to or less than the power indicated by the third power information.

The imaging apparatus may include a restrictor (camera controlling CPU 306) configured to restrict the function of the accessory when the sum of the power indicated by the first power information and the power indicated by the second power information exceeds the power indicated by the third power information. The acquirer may acquire individual information of the accessory apparatus from the imaging apparatus, and may acquire the first power information based on the individual information, and the transmitter may transmit the first power information to the accessory.

In each embodiment, the accessory is attachable between the imaging apparatus and the lens apparatus, and includes a communicator (accessory power mode communicator 209) configured to transmit power information indicating power available for the accessory to the imaging apparatus or the lens apparatus. The accessory may operate in a power mode within power difference between the power which the imaging apparatus can currently supply and the power of the lens apparatus. The accessory control CPU 201 may be settable of a plurality of power modes, the communicator may receive instruction on the power mode of the accessory (as a command for the accessory functional restriction) from the imaging apparatus or the lens apparatus, and the accessory control CPU 201 may select the power mode among the plurality of power modes received by the communicator.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

The embodiments of the present invention can provide a lens apparatus, an imaging apparatus, an accessory, and a storage medium that can properly set power which the imaging apparatus can currently supply, and power consumption of each of the lens apparatus and the accessory.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-091055, filed on May 14, 2019 which is hereby incorporated by reference herein in its entirety.

What is claimed is:

1. A lens apparatus attachable to an imaging apparatus via an accessory, the lens apparatus comprising:
   an acquirer configured to acquire first power information indicating power available for the accessory;
   a determiner configured to determine second power information indicating power available for the lens apparatus based on the first power information; and
   a transmitter configured to transmit, to the imaging apparatus, the second power information or power information relating to the first power information and the second power information.

2. The lens apparatus according to claim 1, wherein the acquirer acquires identification information of the accessory from the imaging apparatus; and the acquirer acquires the first power information based on the identification information.

3. The lens apparatus according to claim 2, wherein the transmitter transmits the second power information to the imaging apparatus.

4. The lens apparatus according to claim 1, wherein the acquirer acquires the first power information from the accessory via communications.

5. The lens apparatus according to claim 4, wherein the transmitter transmits, to the imaging apparatus, power information relating to the first power information and the second power information.

6. The lens apparatus according to claim 5, wherein the second power information is one of a plurality of pieces of power information settable for the lens apparatus, and
   wherein, among the plurality of pieces of power information, the power information relating to the first power information and the second power information indicates power that is larger than a sum of the power indicated by the first power information and the power indicated by the second power information, and is closest to the sum of the power indicated by the first power information and the power indicated by the second power information.

7. The lens apparatus according to claim 1, wherein the determiner acquires, from the imaging apparatus, third power information indicating power which the imaging apparatus can currently supply, and determines the second power information based on the first power information and the third power information.

8. The lens apparatus according to claim 7, wherein the determiner determines the second power information such that a sum of the power indicated by the first power information and the power indicated by the second power information is equal to or less than the power indicated by the third power information.

9. The lens apparatus, according to claim 7, wherein the transmitter transmits, to the imaging apparatus, a signal instructing a functional restriction of the accessory when a sum of the power indicated by the first power information and the power indicated by the second power information is larger than the power indicated by the third power information.

10. The lens apparatus according to claim 9, further comprising a notifying unit configured to notify a user of the functional restriction when the lens apparatus transmits the signal to the imaging apparatus.

11. An imaging apparatus to which a lens apparatus is attachable via an accessory, the imaging apparatus comprising:
   an acquirer configured to acquire first power information indicating power available for the accessory;
   a determiner configured to determine second power information indicating power available for the lens apparatus based on the first power information; and
   a transmitter configured to transmit the second power information to the lens apparatus.

12. The imaging apparatus according to claim 11, wherein the determiner determines the second power information based on the first power information and third power information indicating power that the imaging apparatus can currently supply.

13. The imaging apparatus according to claim 12, wherein the determiner determines the second power information such that a sum of the power indicated by the first power information and the power indicated by the second power information is equal to or less than the power indicated by the third power information.

14. The imaging apparatus according to claim 12, further comprising a restrictor configured to restrict a function of the accessory when a sum of the power indicated by the first power information and the power indicated by the second power information is lamer than the power indicated by the third power information.

15. The imaging apparatus according to claim 11, wherein the acquirer acquires individual information of the accessory from the imaging apparatus, and acquires the first power information based on the individual information, and
   wherein the transmitter transmits the first power information to the accessory.

* * * * *